United States Patent [19]

Mackiewicz et al.

[11] Patent Number: 4,539,892
[45] Date of Patent: Sep. 10, 1985

[54] HYDRAULIC BRAKE BOOSTER

[75] Inventors: John E. Mackiewicz, Niles, Mich.;
Jack Martinic, South Bend, Ind.

[73] Assignee: Allied Corporation, Morristown, N.J.

[21] Appl. No.: 588,430

[22] Filed: Mar. 12, 1984

[51] Int. Cl.³ .................... F15B 13/10; F01B 25/02
[52] U.S. Cl. .............................. 91/391 R; 91/5;
91/6; 91/448; 60/547.3
[58] Field of Search ............. 91/391 R, 5, 6, 448;
60/547.3

[56] References Cited

U.S. PATENT DOCUMENTS

| | | | |
|---|---|---|---|
| 3,610,101 | 10/1971 | Meyers | 91/391 R |
| 4,281,585 | 8/1981 | Runkle et al. | 91/5 |
| 4,353,209 | 10/1982 | Putt | 60/547.3 |
| 4,377,105 | 3/1983 | Fecher | 91/391 R |

Primary Examiner—Paul E. Maslousky
Attorney, Agent, or Firm—Ronald D. Welch; Ken C. Decker

[57] ABSTRACT

A hydraulic brake booster comprises a housing forming a pressure chamber and a pair of bores leading to the pressure chamber. One of the bores receives an output piston and the other bore receives a valve member. The valve member is movable by an input actuator to control communication of fluid pressure to the pressure chamber. The end of the valve member within the pressure chamber carries a sleeve and a poppet. The sleeve resiliently imparts movement to the valve member and the poppet cooperates with the sleeve to close communication to the pressure chamber in response to movement of the sleeve relative to the valve member.

2 Claims, 3 Drawing Figures

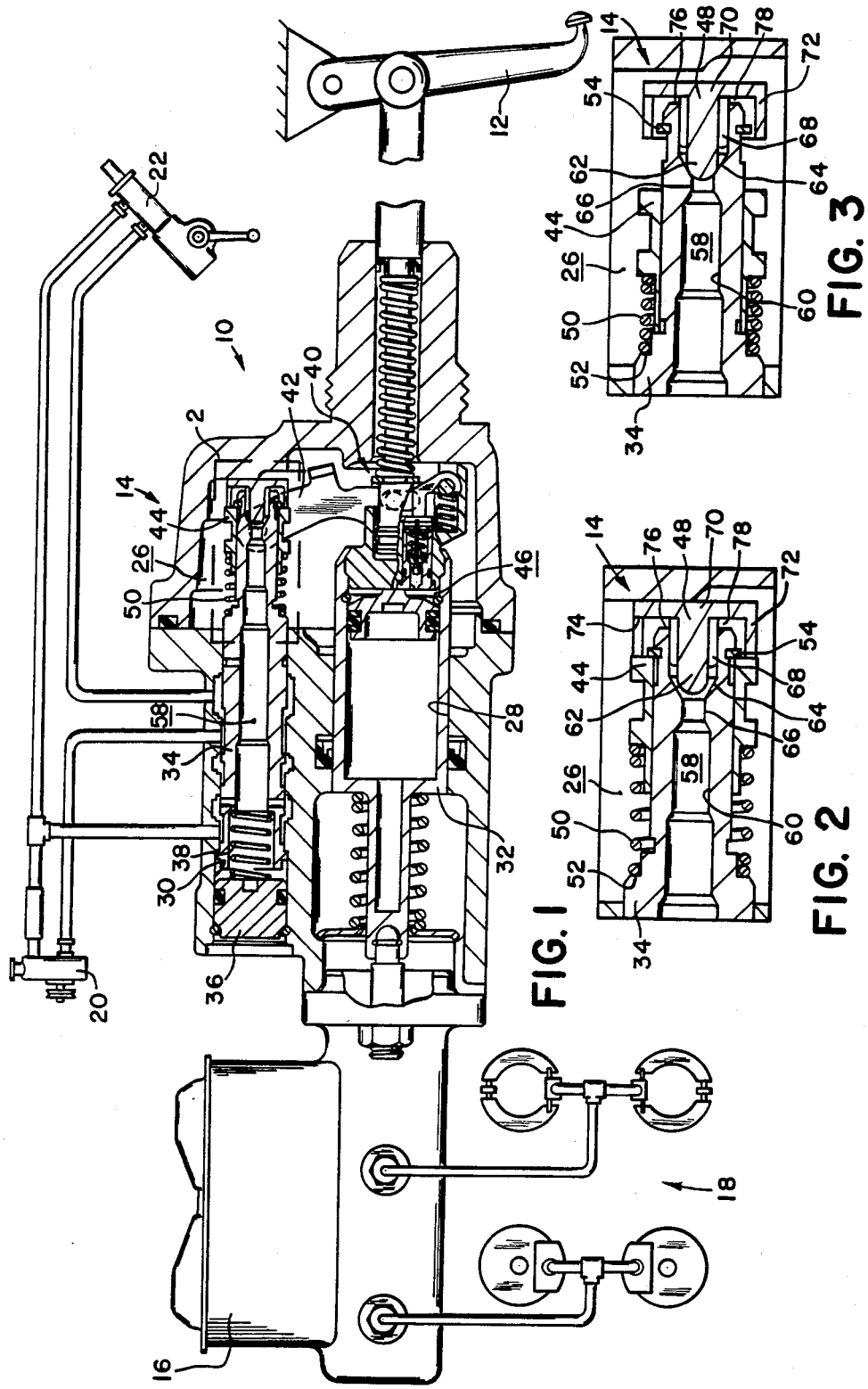

HYDRAULIC BRAKE BOOSTER

A hydraulic brake booster includes a housing defining a pressure chamber and a pair of bores leading to the pressure chamber. An output piston is movably disposed within one of the bores and a valve member is movably disposed within the other bore. An input actuator cooperates with the valve member to control communication of fluid pressure to the pressure chamber during braking and the input actuator cooperates with the output piston when the fluid pressure is insufficient to move the output piston.

In U.S. Pat. No. 4,281,585 (Runkle et al) the valve member is provided with an opening therethrough to define a fluid passage leading to the pressure chamber. One end of the valve member carries a sleeve to selectively close communication through radial ports and a ball is retained within the fluid passage to form a one way check valve preventing fluid communication from the pressure chamber in the direction of the fluid passage. When the sleeve is moved on the valve member to close the pressure chamber to the fluid passage, the interface between the sleeve and valve member acts like a seal. Therefore, the sleeve is designed for tight tolerances relative to an outer dimension for the valve member. These tight tolerances add to the cost of the sleeve and valve member, so that it would be desirable to eliminate the tight tolerances and yet retain the function of the sleeve.

The present invention provides a hydraulic brake booster comprising a housing defining a pressure chamber with a pair of bores leading to the pressure chamber, an output piston movably disposed within one of the pair of bores, a valve member movably disposed within the other bore and defining a fluid passage communicating fluid pressure to the pressure chamber in response to movement of the valve member, the valve member movably carrying a sleeve at one end in the pressure chamber cooperating with an actuator which controls movement of the valve member, a resilient member biasing the sleeve to a rest position on the valve member, and a poppet member engageable with the sleeve and cooperating with the valve member to open the fluid passage to the pressure chamber during a first mode of operation, characterized by the sleeve being movable relative to the valve member in a second mode of operation during braking when the fluid pressure in the pressure chamber is insufficient to move the output piston in order to permit the poppet member to fully seat against the valve member and close communication between the pressure chamber and the fluid passage, whereby the sleeve merely slides on the valve member without any sealing relation thereto.

It is an advantage of the present invention that the poppet member readily adapts to the configuration of the sleeve and valve member to solely control opening and closing communication between the fluid passage and the pressure chamber.

In the drawings,

FIG. 1 shows a schematic illustration of a brake system having a hydraulic brake booster constructed in accordance with the present invention illustrated in cross section.

FIG. 2 is an enlarged view of the circumscribed portion of FIG. 1, and

FIG. 3 is a view similar to FIG. 2 with the sleeve in a different mode of operation.

The brake system 10 in FIG. 1 comprises a brake pedal 12 coupled to a hydraulic brake booster 14 cooperating with a master cylinder 16 to communicate fluid pressure during braking to a set of wheels 18. The hydraulic brake booster 14 receives fluid pressure from a power steering pump 20 and communicates the fluid pressure to a power steering gear 22 via suitable conduits.

The hydraulic brake booster 14 includes a housing 24 forming a pressure chamber 26 with a pair of bores 28 and 30 leading to the pressure chamber 26. The bore 28 movably receives an output piston 32 and the bore 30 movably receives a valve member 34. The output piston 32 extends outwardly of the housing 14 through the bore 28 to cooperate with the master cylinder in a conventional manner. The bore 30 receives a plug 36 and a spring 38 extends from the plug 36 to bias the valve member away from the plug 36 toward the pressure chamber 26. An input actuator 40 extends into the pressure chamber to oppose the output piston 32 and includes a lever 42 coupled to the output piston 32 and the valve member 34 via a sleeve 44. The output piston 32 includes an internal accumulator 46 which is selectively communicated with the pressure chamber in order to charge the accumulator with fluid pressure and also to vent the stored fluid pressure to the pressure chamber when the fluid pressure in the pressure chamber is insufficient to move the output piston 32 during braking.

Turning to FIG. 2, the valve member 34 carries the sleeve 44 within the pressure chamber 26. The valve member 34 also carries a poppet 48 in the pressure chamber 26 to engage the housing 14 in a rest position. The poppet also engages the sleeve 44 and a spring 50 extends from a shoulder 52 on the valve member 34 to bias the sleeve toward a stop 54 fastened to the valve member 34. A fluid passage 58 is formed by an opening 60 extending longitudinally through the valve member 34 to communicate fluid pressure to the pressure chamber in a manner hereinafter described. The poppet 48 defines a central portion 62 extending into the opening 60 to oppose a seat 64 formed by a land 66 extending radially inwardly within the opening 60. The central portion 62 includes ribs 68 engaging the wall of the opening 60 and cooperating therewith to communicate the fluid passage 58 with the pressure chamber. The central portion 62 terminates in a base 70 engaging the housing 14 in the rest position shown in FIG. 2. The outer periphery of the base 70 includes a skirt 72 extending toward the sleeve 44 to engage the latter and a plurality of slots 74 on the skirt complete fluid communication from the fluid passage 58 between the ribs 68 and out the slots 74 to the pressure chamber 26. In the rest position of FIG. 2, the end 76 valve member 34 remains spaced from the base 70 to form a gap 78 because the spring 50 is stronger than the spring 38. With the base abutting the housing 14 and the skirt 72 abutting the sleeve, the spring 50 will maintain the valve member 34 in position engaging stop 54 with sleeve 44 to establish gap 78.

In FIG. 3, the valve member 34 is moved toward the plug 36 to collapse spring 38. Thereafter, the input actuator 40 biases the sleeve 44 to move via lever 42 to collapse spring 50. As shown, the sleeve 44 is spaced from the stop 54 and the poppet 48. The poppet 48 is free to slide in the opening 60 via the ribs 68 to engage seat 64 when the input actuator 40 opens the accumulator 46 to the pressure chamber 26 to communicate fluid pressure thereto. The central portion 62 defines an axial length which is longer than an axial clearance 80 between the plug 36 and the valve member 34. Consequently, when the valve member is engaging the plug 36, the poppet 48 will remain in the valve member opening 60.

During normal braking, the input actuator 40 is moved toward the output piston 32 to pivot lever 42. The pivoting lever moves the valve member 34 toward the plug 36 via the sleeve 44 and spring 50. The valve member opens the fluid passage 58 to fluid pressure generated by the power steering pump 20 to communicate fluid pressure to the pressure chamber 26 via ribs 68, gap 78 and slots 74. With fluid pressure communicated to pressure chamber the output piston 32 is moved toward the master cylinder 16 to effectuate braking for the wheels 18. Upon temination of braking the valve member is moved via spring 38 to return to its rest position and communicate the fluid pressure chamber with a return port, thereby venting the fluid pressure in the pressure chamber 26 to a reservoir for the power steering pump 20. Throughout this normal braking cycle, the sleeve 44 remains in abutment with the stop 54 and the poppet 48 to provide open communication between the fluid passage 58 and the pressure chamber 26.

If the power steering pump fails or the valve member fails to move within the bore 30 during a brake application, the pivoting motion of the lever 42 biases the sleeve 44 to move on the valve member 34. If the power steering pump failed, the valve member 34 will be in abutment with the plug when the sleeve 44 is moved on the valve member 34. The sleeve 44 moves away from the stop 54 and away from the poppet 48 so that the poppet 48 is free to move within the opening 60. Further movement of the input actuator 40 opens the accumulator 46 to the pressure chamber 26 to communicate fluid pressure to the latter. As a result, the fluid pressure biases the poppet 48 to move toward the displaced sleeve so that the central portion 62 engages the seat to close the fluid passage 58 from the pressure chamber 26. As seen on the Figures the skirt diameter dimension is larger than a diameter dimension for the stop 54 so that the skirt telescopes over the stop when the poppet is moved to close the fluid passage 58. Upon termination of braking, the springs 38 and 50 cooperate to move the valve member and sleeve to their rest positions so that the fluid pressure in pressure chamber 26 will be released through fluid passage 58 and permit the output piston to return to its rest position to terminate the power assisted brake application.

Because the sleeve 44 does not define any fluid passage the fit of the sleeve 44 on the end of the valve member is merely a sliding fit without any sealing relationship with the end of the valve member. In a preferred embodiment the poppet 48 is made from a plastic-like material, such as 30% glass-filled NYLON. Although not shown, it is feasible to provide a resilient member biasing the poppet toward the sleeve 44 so long as the spring constant of such a resilient member is less than the spring constant of spring 44. With such a resilient member, the poppet will be moved with the sleeve in the failure mode to immediately close the fluid passage rather than utilize fluid pressure to move the poppet.

We claim:

1. A hydraulic brake booster comprising a housing defining a pressure chamber with a pair of bores leading to the pressure chamber, an output piston movably disposed within one of the pair of bores, a valve member movably disposed within the other bore and defining a fluid passage communicating fluid pressure to the pressure chamber in response to movement of the valve member between first and second operative positions, the valve member movably carrying a sleeve at one end thereof, said sleeve being disposed in the pressure chamber and cooperating with an actuator which controls movement of the valve member, a resilient member biasing the sleeve to a rest position on the valve member, and a poppet member engageable with the sleeve and cooperating with the valve member to open the fluid passage to the pressure chamber during a first mode of operation, characterized by the sleeve being movable on the valve member in a second mode of operation during braking when the fluid pressure in the pressure chamber is insufficient to move the output piston in order to permit the poppet member to fully seat against the valve member and close communication between the pressure chamber and the fluid pressure, the sleeve being slidable on the valve member with a non-fluid-tight clearance therebetween, the poppet member including an annular skirt telescoping over the said one end of the valve member to oppose the sleeve and the annular skirt and provided with at least one slot providing fluid communication between the fluid passage and the pressure chamber.

2. A hydraulic brake booster comprising a housing defining a pressure chamber with a pair of bores leading to the pressure chamber, an output piston movably disposed within one of the pair of bores, a valve member movably disposed within the other bore and defining a fluid passage communicating fluid pressure to the pressure chamber in response to movement of the valve member between first and second operative positions, the valve member movably carrying a sleeve at one end thereof, said sleeve being disposed in the pressure chamber and cooperating with an actuator which controls movement of and the valve member, a resilient member biasing the sleeve to a rest position on the valve member, and a poppet member engageable with the sleeve and cooperating with the valve member to open the fluid passage to the pressure chamber during a first mode of operation, characterized by the sleeve being movable on the valve member in a second mode of operation during braking when the fluid pressure in the pressure chamber is insufficient to move the output piston in order to permit the poppet member to fully seat against the valve member and close communication between the pressure chamber and the fluid passage, the sleeve being slideable on the valve member with a non-fluid-tight clearance therebetween, the end of said valve member distal said one end defining an axial spacing with the end of said bore distal said pressure chamber, the poppet member having an axial portion disposed within the fluid passage and having a length greater than the axial spacing to retain the poppet member in the fluid passage at all operative positions of said valve member between said first and second operative positions.

* * * * *